United States Patent
Keicher et al.

(10) Patent No.: US 6,656,409 B1
(45) Date of Patent: Dec. 2, 2003

(54) MANUFACTURABLE GEOMETRIES FOR THERMAL MANAGEMENT OF COMPLEX THREE-DIMENSIONAL SHAPES

(75) Inventors: David M. Keicher, Albuquerque, NM (US); James W. Love, Las Lunas, NM (US)

(73) Assignee: Optomec Design Company, Albuquerque, NM (US)

( * ) Notice: Subject to any disclaimer, the term of this patent is extended or adjusted under 35 U.S.C. 154(b) by 0 days.

(21) Appl. No.: 09/611,804

(22) Filed: Jul. 7, 2000

Related U.S. Application Data

(60) Provisional application No. 60/143,142, filed on Jul. 7, 1999.

(51) Int. Cl.[7] .................. B29C 35/08; B29C 41/02; B29C 41/20

(52) U.S. Cl. ............ 264/401; 219/121.66; 219/121.84; 219/121.85; 264/41; 264/46.4; 264/113; 264/255; 264/259; 264/308; 264/497

(58) Field of Search .................. 264/41, 46.4, 113, 264/255, 259, 308, 401, 497; 219/121.66, 121.84, 121.85

(56) References Cited

U.S. PATENT DOCUMENTS

| | | |
|---|---|---|
| 4,200,669 A | 4/1980 | Schaefer et al. |
| 4,323,756 A | 4/1982 | Brown et al. |

(List continued on next page.)

FOREIGN PATENT DOCUMENTS

| | | |
|---|---|---|
| CA | 2131248 | 1/1999 |
| DE | 3541999 A1 | 6/1987 |
| EP | 0 555 896 A1 | 8/1993 |
| EP | 0 950 502 A2 | 10/1999 |
| WO | WO 92/18323 A1 | 10/1992 |
| WO | WO 97/16274 A1 | 5/1997 |

OTHER PUBLICATIONS

Keicher, D.M., et al., "The Laser Forming of Metallic Components Using Particulate Materials", *JOM*, May, 1997, pp. 51–54.

Nakai, T., et al., "Fabrication of Three–Dimensional Objects Using Laser Lithography", *Systems and Computers in Japan*, 1989, vol. 20, No. 3, pp. 58–67, Scripta Technica, Inc.

Smugeresky, J.E., et al., "Laser Engineered Net Shaping (LENS™) Process: Optimization of Surface Finish and Microstructural Properties", Jun. 30, 1997, pp. 1–11.

Smugersky, J.E., et al., "Using the Laser Engineered Net Shaping (LENS™) Process to Produce Complex Components from a CAD Solid Model", *Proceedings of the SPIE–The International Society for Optical Engineering Lasers as Tools for Manufacturing II*, Feb. 12–17, 1997, pp. 3–9.

*Primary Examiner*—Leo B. Tentoni
(74) *Attorney, Agent, or Firm*—Jeffrey D. Myers

(57) ABSTRACT

Uniform cooling of complex surface shapes in injection mold tooling can be accomplished with cooling channels that conform to the shapes of the mold cavity or mold cone. By conventional methods this can be very difficult to accomplish. By applying methods of material deposition or material sintering, which include but are not limited to, laser metal deposition, where material is deposited on a layer by layer basis, certain cooling or heating passages could be integrated into the manufactured component that follow the contours and profiles of the mold's complex surfaces. These passages would act as internal heat sinks with a much higher surface area for heat transfer than traditional drilled and plugged straight passages. These geometries could also be incorporated into complex geometries such as, but not limited to, turbine blades where the cooling passages can follow the contour of the outer shape, provide a more uniform or controlled heat transfer from the component. Multiple loops of cooling or heating channels could be designed and manufactured into solid objects for small-scale heat exchanger technologies.

19 Claims, 8 Drawing Sheets

U.S. PATENT DOCUMENTS

| | | |
|---|---|---|
| 4,724,299 A | 2/1988 | Hammeke |
| 4,927,992 A | 5/1990 | Whitlow et al. |
| 4,947,463 A | 8/1990 | Matsuda et al. |
| 5,043,548 A | 8/1991 | Whitney et al. |
| 5,126,102 A | 6/1992 | Takahashi et al. |
| 5,173,220 A | 12/1992 | Reiff et al. |
| 5,176,328 A | 1/1993 | Alexander |
| 5,208,431 A | 5/1993 | Uchiyama et al. |
| 5,306,447 A | 4/1994 | Marcus et al. |
| 5,393,613 A | 2/1995 | MacKay |
| 5,398,193 A | 3/1995 | de Angelis |
| 5,405,660 A | 4/1995 | Psiuk et al. |
| 5,418,350 A | 5/1995 | Freneaux et al. |
| 5,477,026 A | 12/1995 | Buongiorno |
| 5,518,680 A * | 5/1996 | Cima et al. .................. 264/401 |
| 5,578,227 A | 11/1996 | Rabinovich |
| 5,653,925 A * | 8/1997 | Batchelder .................. 264/113 |
| 5,697,046 A | 12/1997 | Conley |
| 5,705,117 A | 1/1998 | O'Connor et al. |
| 5,707,715 A | 1/1998 | deRochemont et al. |
| 5,746,844 A | 5/1998 | Sterett et al. |
| 5,775,402 A | 7/1998 | Sachs et al. |
| 5,779,833 A | 7/1998 | Cawley et al. |
| 5,837,960 A | 11/1998 | Lewis et al. |
| 5,847,357 A | 12/1998 | Woodmansee et al. |
| 5,849,238 A * | 12/1998 | Schmidt et al. ............. 264/401 |
| 5,993,554 A | 11/1999 | Keicher et al. |
| 6,046,426 A | 4/2000 | Jeantette et al. |
| 6,144,008 A | 11/2000 | Rabinovich |
| 6,251,488 B1 | 6/2001 | Miller et al. |
| 6,268,584 B1 | 7/2001 | Keicher et al. |

* cited by examiner

MANUFACTURABLE GEOMETRIES FOR THERMAL MANAGEMENT OF COMPLEX THREE-DIMENSIONAL SHAPES

CROSS-REFERENCE TO RELATED APPLICATIONS

This application claims the benefit of the filing of U.S. Provisional Patent Application Ser. No. 60/143,142, filed on Jul. 7, 1999, and the specification thereof is incorporated herein by reference.

BACKGROUND OF THE INVENTION

Direct material deposition processes allow complex components to be efficiently fabricated in small lot sizes to meet the stringent requirements of the rapidly changing manufacturing environment. This process produces three-dimensional parts directly from a computer aided design (CAD) solid model. U.S. Pat. No. 4,323,756 teaches that complex, net-shaped objects can be built by sequential layer deposition of feedstock material in powder or wire form, whereby the material is directed into a focused laser beam, melted, and deposited onto a deposition substrate to generate solid objects of varying three-dimensional complexity in a layer-wise manner. Other prior art using this method includes "Using the Laser Engineered Net Shaping (LENS™) Process to Produce Complex Components from a CAD Solid Model" by D. M. Keicher et al. in SPIE Conference, San Jose, Calif., January 1997. This method of direct material fabrication uses a single nozzle or powder delivery system that introduces a converging stream of powdered material into the laser beam at or near the beam's minimum diameter (i.e. focus or focal plane). The stream is at an angle off-normal to a deposition surface whereby uniform geometries of three-dimensional objects can be produced by providing computer controlled motion of the deposition surface relative to the laser beam. The prior art for this technology in general has focused on methods and approaches to enable the deposition process; however, there is little data available on how best to control these processes to achieve the desired outcome in the solid structure.

U.S. Pat. No. 5,043,548 discloses a laser plasma spraying nozzle and method that permits high deposition rates and efficiencies of finely divided particles of a wide range of feed materials. This system uses powdered materials that are carried to the interaction regions via a carrier gas and lasers to melt these particles. However, this system relies solely on the use of a plasma to melt the particles before they are ever introduced to the deposition region. In fact, the carrier gas is often a mixture which promotes ionization, and, as such, the formation of a plasma. The plasma serves to melt the powder particles before they ever come into contact with the deposition substrate. In addition, the beam is diverging such that when it does impact the deposition substrate, the beam irradiance is sufficiently low so that no melting of the deposition substrate occurs. A great distance between the focal point of the laser and the central portion of the plasma is maintained to prevent the substrate from melting. This distance, ranging from 1–6 inches, is a characteristic of this apparatus. The materials are deposited in either a liquid or gaseous state. This design provides a unique method for coating parts; however, it has never been intended for fabrication of multi-layered parts. Due to the diverging nature of the powder material, this plasma technique fails to provide the feature definition necessary for fabricating complex, net-shaped objects. In this patent, the inventors describe several process conditions used to successfully deposit materials in thin layers, yet there is no correlation drawn between the materials' properties and the processing conditions. Another nozzle design is shown in U.S. Pat. No. 4,724,299. This nozzle design requires the powder to be delivered from an annular source that is coaxial with a single laser beam. This design provides a uniform feed of powder to the cladding region, a laser used as an energy source to melt the powder that is to be deposited, and a powder distribution system. However, this system requires that the powder distribution system be contained within the nozzle assembly.

This nozzle design is very specific to the laser cladding application. The term laser cladding is used specifically to imply surface modification and not the direct fabrication method. More importantly, the design relies on having an annular powder distribution channel to deliver the powder to the deposition region. The annular powder distribution region provides powder to the focused laser beam from all directions and does not concentrate the powder for a tightly focused powder stream. For a single laser beam that is coaxial to the powder flow, this nozzle should work well to provide a uniform layer and in fact may very likely be applied to directly fabricate metallic components from a CAD solid model. Again, however, there is no mention on how the process conditions will affect material properties.

U.S. Pat. No. 4,323,756 also covers the direct metal deposition (DMD) process. This technique uses both wires and powders as filler material. It also uses a single laser beam to deposit the various materials. This patent teaches that the volume of the feedstock material must be less than that of the melted substrate material. However, this reduces the rate of deposition and increases the time to produce parts. The requirement to limit the volume of the feedstock material to be less than that of the melted substrate material was driven by the desire to remove impurities and obtain epitaxial growth. Instead of removing impurities by continuously remelting the previously deposited materials, impurities can be efficiently eliminated by performing the deposition in a controlled atmosphere environment, such as a glove box. Furthermore, expitaxial growth is not desired in most three-dimensional parts, since it may result in anisotropic material characteristics. For most general applications, uniform material properties are desired that do not limit the feedstock volume to be less than that of the deposition substrate melted region. In fact, our data suggests that there may be advantages to minimizing heat input to the deposited substrate to enhance material properties.

U.S. Pat. No. 5,578,227 contains similarities to these other inventions, such as the use of a positioning system to direct the location of deposition, and the use of a laser to deposit the feedstock material. This patent uses a single laser beam for the deposition process and wire as the feedstock material. A critical claim of this patent that differentiates it from these others requires that the laser cause the feedstock material to bond to the previously deposited layer without substantially altering the cross-section of the newly deposited material. Such a continuous form of material would appear to be prone to substantial problems of warpage and distortion of the deposited layers due to an incomplete melting of the feedstock material. For the powder deposition processes, the feedstock material is completely consumed within the 3-D net shape, with the powder's cross-section being substantially altered. Since only interfacial bonding of the feedstock material occurs, the material properties of the deposited material are not likely to be significantly altered. In addition, there is no discussion on how to control the properties of the material deposited using this technique.

Although casting processes could be used to produce embedded structures within a solid component, these processes would require that the material used to create the embedded structure be removed by some method after the component has been made.

A need exists to understanding these potentially useful processes and, in doing so, to develop a methodology to alter and control material properties during processing.

OBJECTS AND ADVANTAGES

Accordingly, several objects and advantages of the present invention are:

(a) to provide a method to control the thermal properties of a solid structure;

(b) to provide a means to embed hollow and/or multi material structures within a normally solid component;

(c) to provide a means to locally control the thermal history of a structure;

(d) to provide high efficient heat transfer within structures;

(e) to provide a methodology to create components that allow the thermal characteristics of a structure to be engineered into a component by including embedded structures and/or varying materials within that structure; and (f) to provide a means to control pressure drop across embedded structures.

These and other objects and advantages of the invention will become apparent upon review of the specification and appended claims.

BRIEF DESCRIPTION OF THE INVENTION

The present invention provides internal features that can now easily be fabricated in components using direct material deposition techniques coupled with a layer wise manufacturing approach. These features provide thermal control of complex shapes, in ways not previously available. One particular area of impact for this invention is in providing high efficiency cooling for injection mold tooling. This technology provides the ability to create an isothermal surface as well as to provide thermal gradients for controlled thermal processes. The invention describes features and methods that are obtainable by using material deposition manufacturing techniques as well as material sintering techniques. The recent development of precise material deposition processes provides the ability to create structures and material combinations that were previously not viable for manufacture. Traditional methods can not be used for manufacturing of these internal geomtries and multiple material structures such that they are completely enclosed in a solid body.

The use of embedded structures for conformal cooling channels is absolutely beneficial to rapidly and uniformly cooling many complex shapes, both external and internal. These geometries will be limited to certain manufacturing technologies, but will have a wide variety of applications.

DETAILED DESCRIPTION OF THE INVENTION

Figure 1:
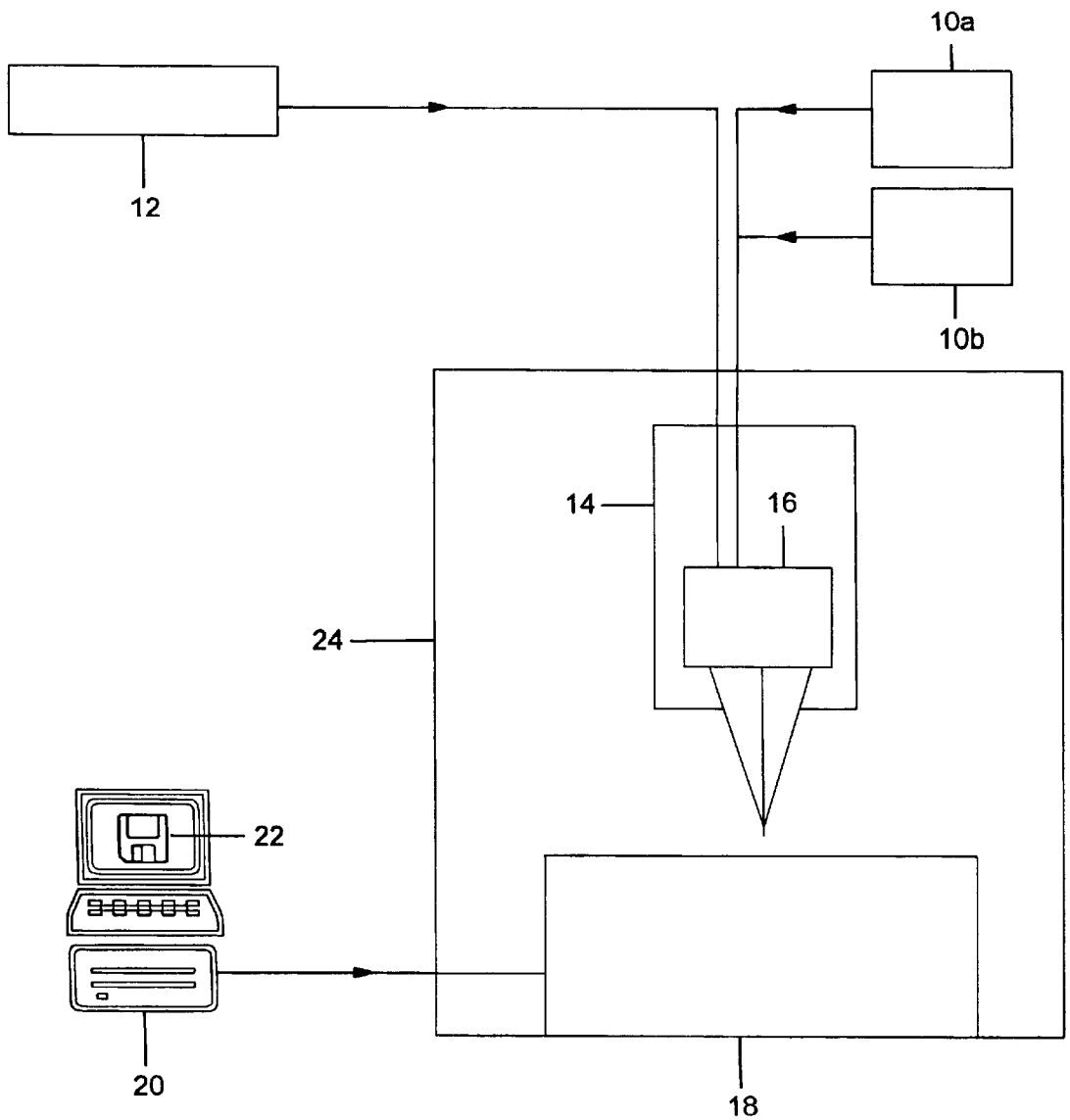
FIG. 1 schematically illustrates a material deposition system that is used to engineer material properties during component fabrication.

In accordance with the present invention, there are provided methods to create embedded features in a three dimensional structure, said method comprising:

a. subjecting one or more feedstocks to a material deposition process and depositing said feedstock onto a substrate;

b. repeating step a. sufficient times in a defined, layerwise pattern to construct said three dimensional structure.

In accordance with another embodiment of the present invention, there are provided methods to control the thermal properties of a solid structure, said method comprising:

a. subjecting one or more feedstocks to a material deposition process and depositing said feedstock onto a substrate;

b. repeating step a. sufficient times in a defined, layerwise pattern, incorporating voids and other material within said pattern to construct a solid structure having controlled thermal properties.

In accordance with yet another embodiment of the present invention, there are provided methods to embed hollow and multi material structures within a normally solid component, said method comprising:

a. subjecting one or more feedstocks to a material deposition process and depositing said feedstock onto a substrate;

b. repeating step a. sufficient times in a defined, layerwise pattern that creates voids or regions containing other materials, to construct a solid component having hollow and multi material structures therein.

In accordance with still another embodiment of the present invention, there are provided methods to locally control the thermal history of a three dimensional structure, said method comprising:

a. subjecting one or more feedstocks to a material deposition process and depositing said feedstocks onto a substrate;

b. repeating step a. sufficient times in a defined, layerwise pattern incorporating regions of voids and/or other materials as necessary to construct a three dimensional structure with a particular thermal history.

In accordance with a further embodiment of the present invention, there are provided methods to provide high efficient heat transfer within a three dimensional structure, said method comprising:

a. subjecting one or more feedstocks to a material deposition process and depositing said feedstock onto a substrate;

b. repeating step a. sufficient times in a defined, layerwise pattern incorporating regions of voids and/or other materials effective to control heat transfer while constructing said three dimensional structure In accordance with a still further embodiment of the present invention, there are provided methods to create components that allow thermal characteristics of a three dimensional structure to be engineered into a component, said method comprising:

a. subjecting one or more feedstocks to a material deposition process and depositing said feedstock onto a substrate;

b. repeating step a. sufficient times in a defined, layerwise pattern, incorporating embedded voids or regions of varying materials, to construct said three dimensional structure.

In accordance with another embodiment of the present invention, there are provided methods to control pressure drop across embedded features in a three dimensional structure, said method comprising:

a. subjecting one or more feedstocks to a material deposition process and depositing said feedstock onto a substrate;

b. repeating step a. sufficient times in a defined, layerwise pattern in which the cross-section area and length of individual embedded structures are approximately equal in order to provide uniform flow characteristics and pressure in said three dimensional structure.

There are often compromises that must be made to work within the constraints of the physical environment. Thermal management within solid structures has often presented such a situation. For example, in tooling there are the often conflicting requirements for a long tool lifetime with efficient cooling. For these applications, designers will typically use some form of tool steel since it can be hardened and will provide a very good wear surface; however, the thermal conductivity of steels in general is relatively poor. So the cycle time for cooling is compromised for long tool life. The invention described herein provides methods to allow these normally conflicting requirements to be simultaneously satisfied. In addition, invention methods provide the ability to exploit the structures beneath the surface of a component to allow the thermal characteristics to be tailored within a structure. In fact, invention methods now provide an opportunity in which the thermal characteristics within a structure can be manipulated to control how a component is heated and cooled.

FIG. 1 is a schematic of a method to produce the thermal management structures contemplated by to this invention. It shows the position of the invention within a direct material deposition system. The system includes: a powder feeding apparatus 10, to deliver a uniform flow of powder to the deposition region; a laser 12, to cause heating and subsequent melting of the powder feed particles; and a deposition head 16. The system also includes a set of orthogonal positioning stages 18, which are computer 20 driven to direct the location of deposition, a vertical positioning stage 14, a computer 20, on which software 22 is used to slice the CAD solid models and generate a motion control program to control deposition processing sequence based on CAD file data; and a sealed chamber 24, to contain the powder particles during processing and provide an inert environment.

Figure 2:
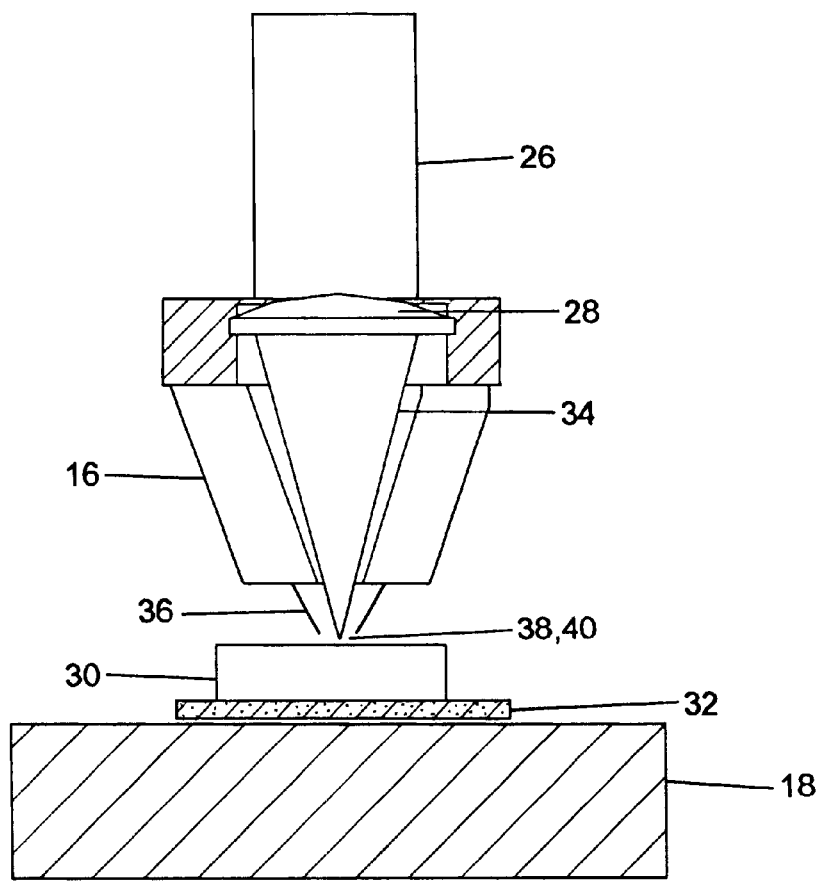
FIG. 2 shows a schematic representation of the direct material deposition process in operation.

FIG. 2 shows the deposition apparatus and is used to describe the general process for the direct material deposition application. In this embodiment, a laser beam 26 is brought in the deposition head 16 where a single spherical focusing lens 28 causes the incident laser beam 26 to focus near the top of a previously deposited material 30 layer. A deposition substrate 32 is used to provide a starting surface for the deposition process. Simultaneous to the arrival of the focused laser beam 34, powdered feedstock material 36 is brought to a convergence at or near the laser beam focal plane 38 created by the focused laser beam 34 to form a beam/powder interaction zone 40. In the beam/powder interaction zone 40 the laser energy is sufficient to cause the powdered feedstock material 36 to be melted and subsequently deposited onto the surface of the deposition substrate 32 to form a layer of deposited material 30 in the desired location. The orthogonal positioning stages 18 provide motion relative to the beam/powder interaction zone 40 and provide a means to deposit the powdered feedstock material 36 in a desired pattern. As each layer of material is deposited, the vertical positioning stage 14 (as shown in FIG. 1) is incremented away from the deposition surface comprised of the top of the previously deposited material 30 layer to allow yet another new layer of material to be deposited. The deposition surface is now at the top of the newly for deposited material 30 layer. The combination of scanning in a plane parallel to deposited material 30 layers and sequencing the deposition head 16 away from the deposition substrate 32 allows a complete object to be fabricated one layer at a time until the entire object is created.

This technology now provides the opportunity to embed features such as chasms and multiple material structures. Several embodiments of this invention rely on this ability. As an example, a chasm structure is shown and the application of this specific structure to the cooling application is discussed. It should be noted, however that the chasm structures may be used for heating as well. These chasm structures can also be filled with a second material that performs some function such as increasing the cooling or heating rate of the structure. The chasm structures may be interconnected to provide uniform thermal control or several chasm structures can exist within a structure such that they are not interconnected to provide localized thermal management within a single structure. These chasm structures can be either actively controlled for thermal condition by flowing a fluid media through them or they can contain a material that locally effects the thermal gradients in that specific region of the component.

Figure 3:
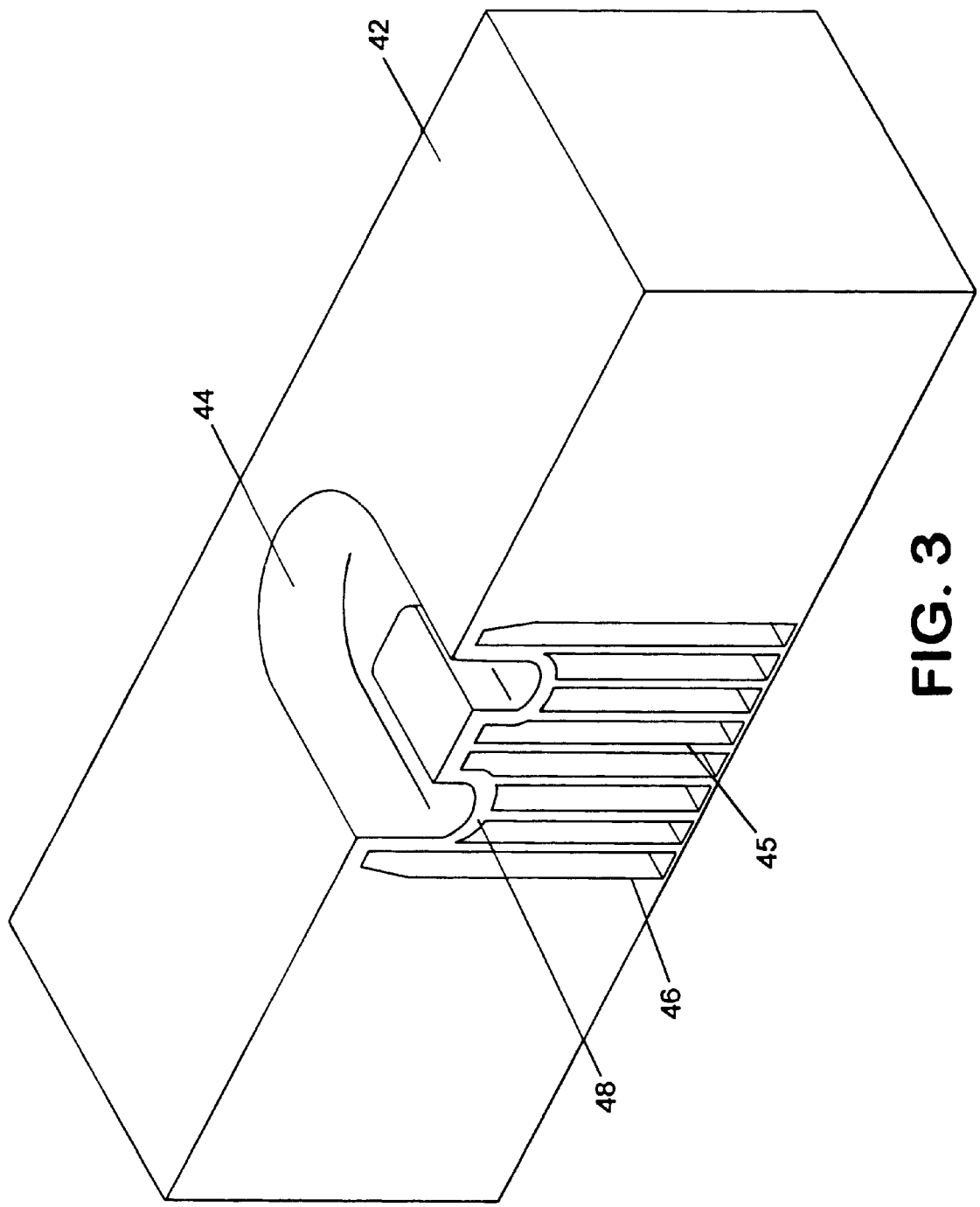
FIG. 3 is a three-dimensional view of a cross sectioned mold insert with a mold cavity, showing the detail of the conformal cooling passages integrated into the mold manufacturing.
Figure 4:
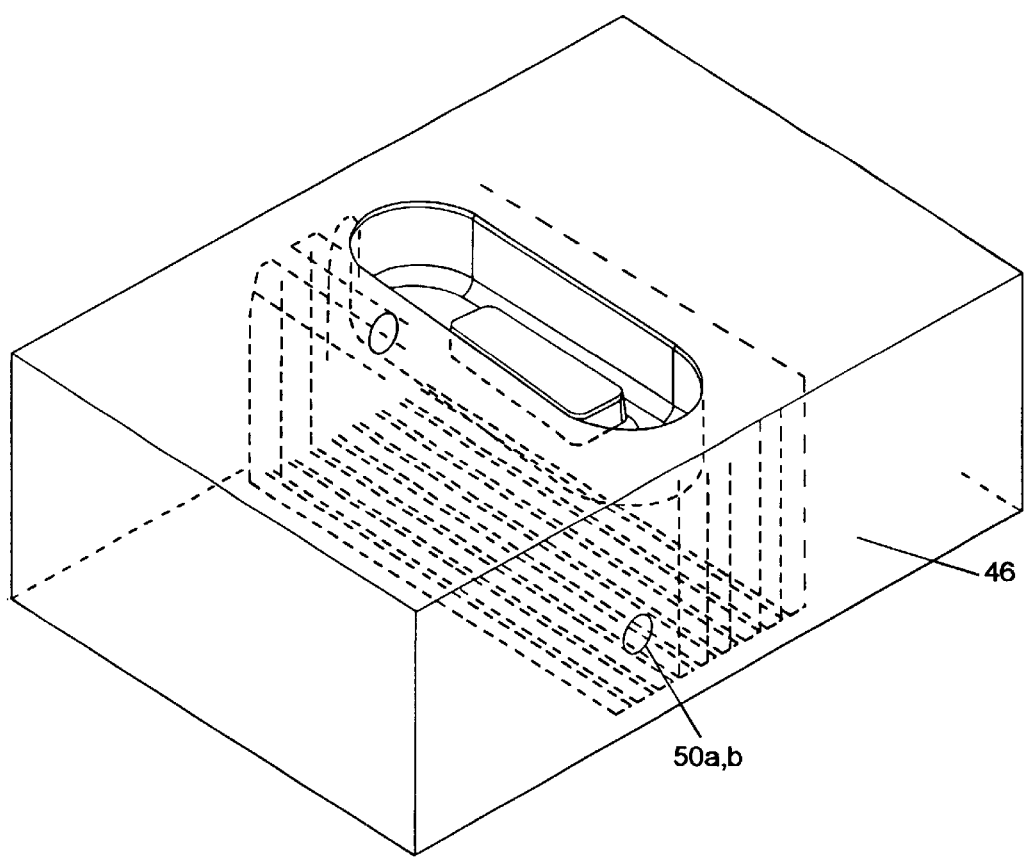
FIG. 4 is a three-dimensional view of the whole mold insert showing the internal geometries as hidden lines, with inlet and outlet ports for coolant media.

A schematic of one preferred embodiment of this invention is given in FIG. 3, showing the geometry of the conformal cooling passages in relationship to the mold cavity. For clarity, the mold chosen has been cross-sectioned through a mid-plane, exposing the internal cooling channels 46 and support fin structures 45. The schematic includes an arbitrarily shaped injection mold insert 42, which represents the mold base that will house the mold cavity 44, and the conformal cooling passages 46. In the context of conformal cooling, the chasm structures follow the contour of the surface that they lie beneath at some prescribed distance beneath the surface. The design of the conformal cooling passages follow the surface of the mold cavity at some prescribed distance or distances 48 determined by the desired cooling balance of the mold cavity. FIG. 4 represents the full mold cavity. Shown here are inlet and outlet ports 50a, b, necessary for the flow of coolant media through the mold conformal cooling passages. Although this application discusses the use of passages that conform to the shape of the mold cavity in the application where multiple materials are used the conformance of the passage to the surface being cooled can be relaxed. This will be discussed below. The cooling passages can be connected by other passages 52 at other locations to generate equal and uniform flow across the bank of cooling channels. This may be necessary for the most optimum and uniform cooling of the mold cavity 44 (as shown in FIG. 3).

Figure 5:
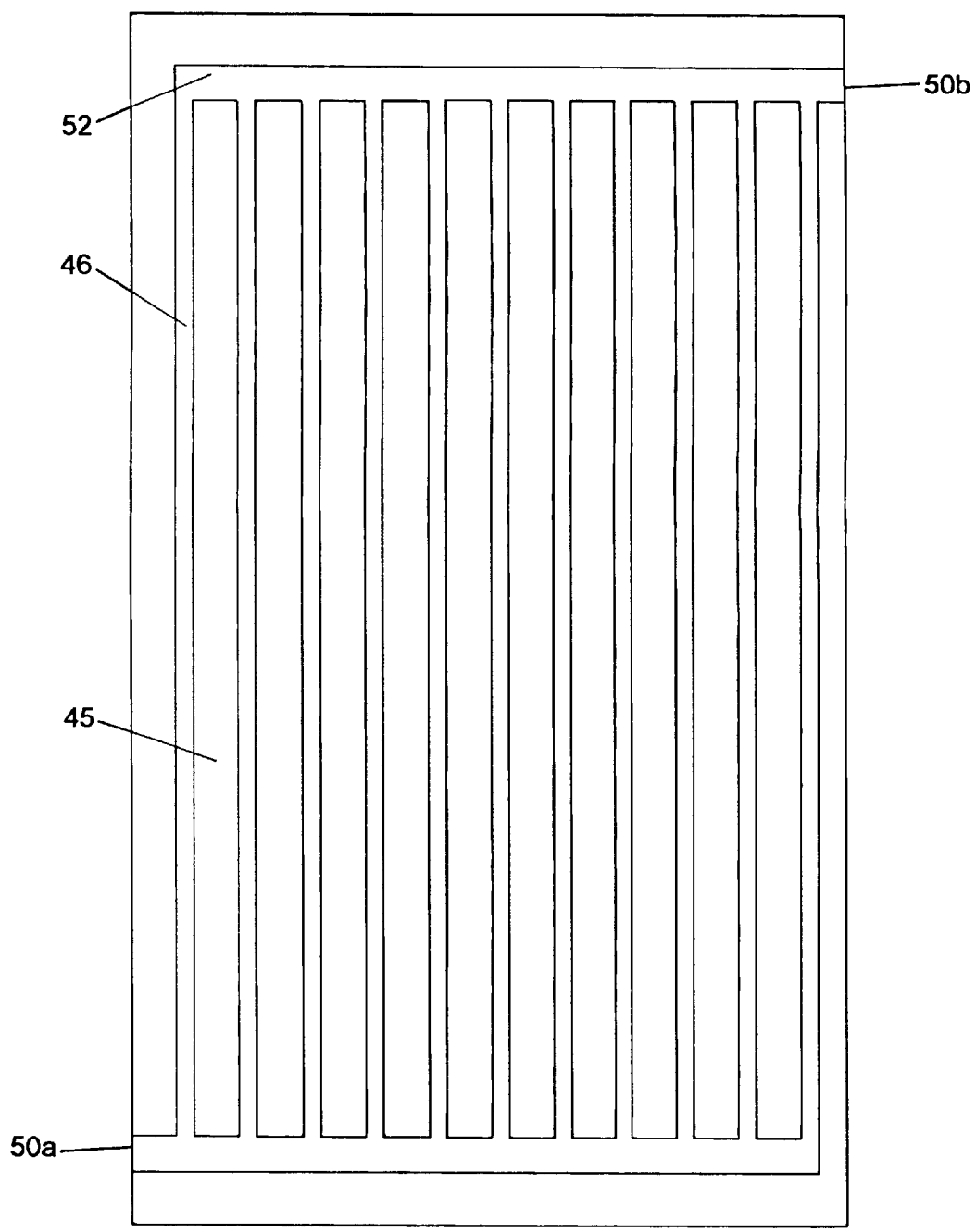
FIG. 5 is a cross sectional view of a circular geometry, shown with the internal cooling geometries integrated into the fabrication of the component.

A further advantage of these structures for use in thermal management lies in the ability to create a constant pressure and uniform flow characteristics of the coolant media across the entire cooling structure. This characteristic is shown in FIG. 5. Although the inlet and outlet ports 50a, b can be introduced into the part from almost any location, their respective location to the inlet and outlet of the cooling channels 46 plays a significant role in obtaining uniform cooling in these structures. As shown in FIG. 5, the cooling channels are terminated in a reservoir like feature 52. This feature does in fact provide a reservoir for the heat exchange media. For this structure the inlet 50a to the structure is at one end on the reservoir while the outlet 50b is at the other end of the opposite reservoir. This provides a constant pressure drop throughout the structure and thus uniform flow. This example is similar to that used in a cross-flow style radiator used in an automobile.

The finned structures 45 (as also shown in FIG. 3) provide several advantages over structures that can be produced using existing methods. The finned structures provide support for the exposed surface where temperature control is desired. This can be critical for applications such as injection molding of plastic parts where the pressure can be on the order of 5000 pounds per square inch. The fins also provide a significant increase in surface area. Typically cooling passages are drilled into a structure since this is a method to achieve this task. However, the circular cross-section of the passages actually minimizes the surface area that is in contact with the thermally conductive media. The finned structures can provide an order of magnitude increase in surface area as compared to drilled passages. This provides an unprecedented advantage in heat transfer. One of the factors that influence the heat transfer rate of a structure is thermal conductivity of the material. A second is the efficiency at which the energy is transferred to the heat conducting media. Having the fins uniformly distributed beneath the surface of the component somewhat compensates for the relatively poor thermal conductivity of the materials.

This invention can be used for rapid, uniform cooling of injection molds. These cooling channels can be fabricated using various material deposition systems. In systems where the material is deposited in a layer by layer manufacturing technique, certain limitations may apply concerning the width of the channels and the closure angle of the topmost features of the channels. For example, when using the LENS™ material deposition technique, channel width can be chosen such that no support material is needed and the channels will in fact remain hollow, open cavities, that are completely enclosed in the mold base.

These direct material deposition processes provide the unique ability to deposit multiple materials within a single build layer. This provides yet another advantage in fabricating structures for thermal management. For many structures, there is a need to control the temperature of a feature where active temperature control is not viable. That is, there may be no way to have an embedded passage within the structure to aid in heat transfer. For this feature, there is the possibility of fabricating the structure such that the region beneath the surface is composed of a high thermal conductivity material. The high thermal conductivity material provides a solid structure that acts as a heat pipe. Provided that the high thermal conductivity material is in contact with the heat exchange media, then the high thermal conductivity structure provides a means to quickly cool the lower thermal conductivity material.

This invention also allows conformal cooling systems to be integrated into mold inserts that are fabricated by deposition techniques. The conformal cooling channels provide uniform support for the mold cavity as well as increase the surface area of the cooling channel surfaces. This increased cooling channel surface area will be directly proportional to the increased amount of cooling that can be obtained by using this type of geometry for cooling structures.

Figure 6:
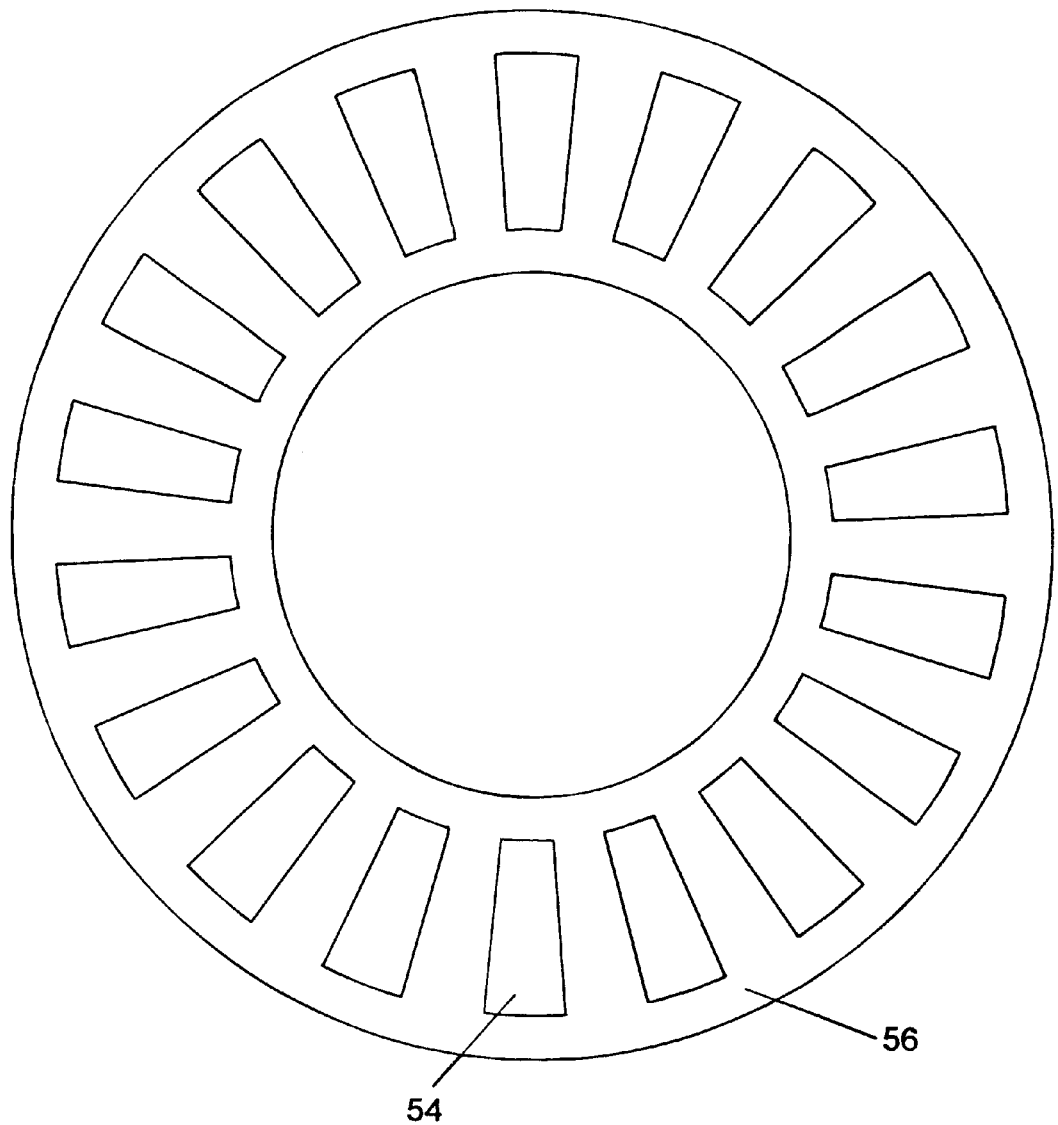
FIG. 6 is a three-dimensional view of a curved geometry, shown with the cooling geometries following the contours of the outer shape.
Figure 7:
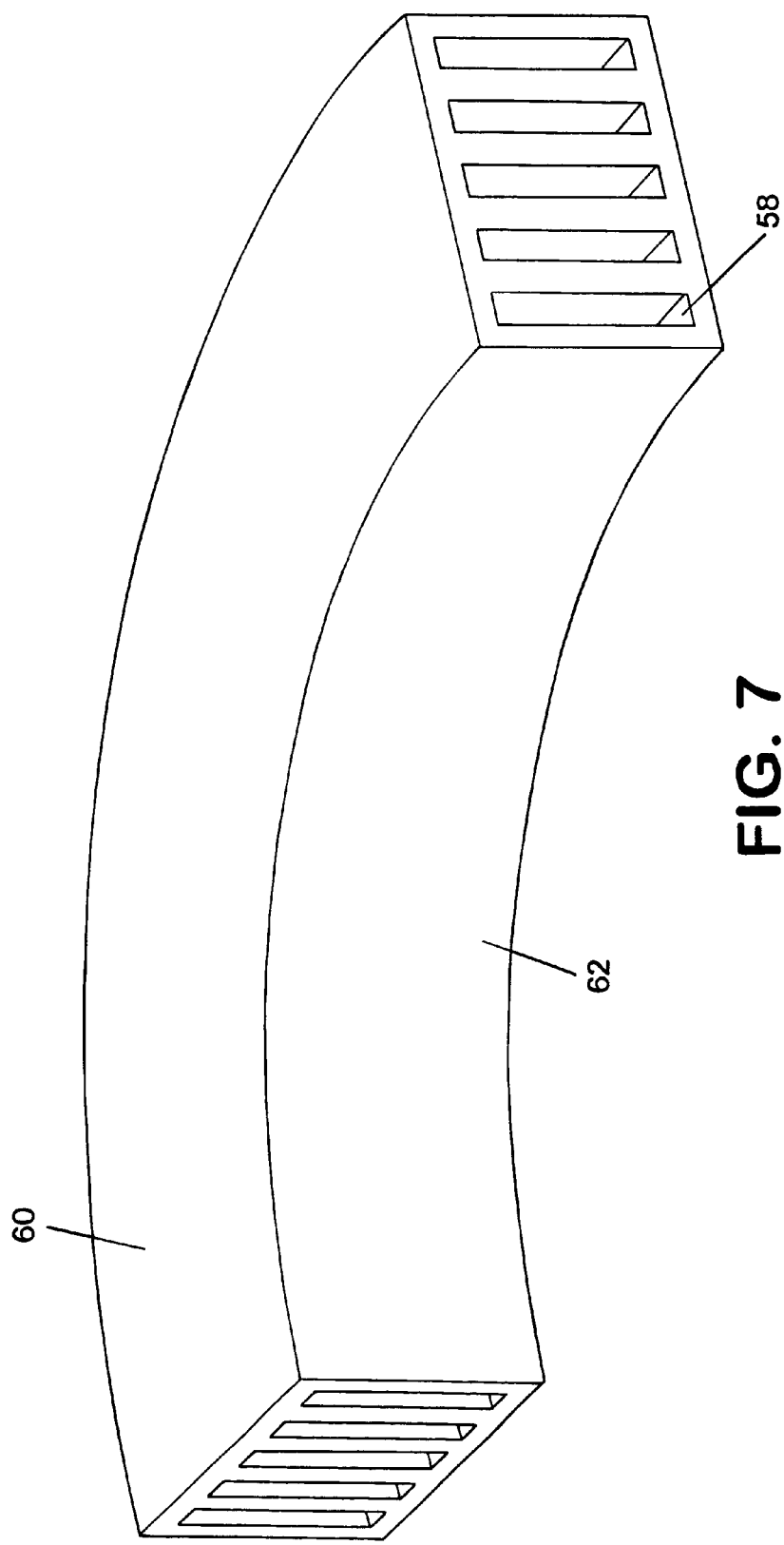
FIG. 7 is a cross sectional view of complex cooling geometries of separate loops fabricated into the component.

A schematic of an alternate embodiment is given in FIG. 6., showing usage of the cooling passage geometry internal 54 to some arbitrary crossectional shape 56 of some arbitrary length into the view. Using this geometric cooling structure increases surface area for cooling by a significant amount. Until the material deposition techniques emerged, this geometry would be very complex and difficult using conventional machining and casting techniques. Also, the internal cooling structure can vary in cross section and direction. FIG. 7 shows the ability of cooling geometries 58 to be incorporated into an arbitrary shape 60 with an arbitrary curve 62.

Figure 8:
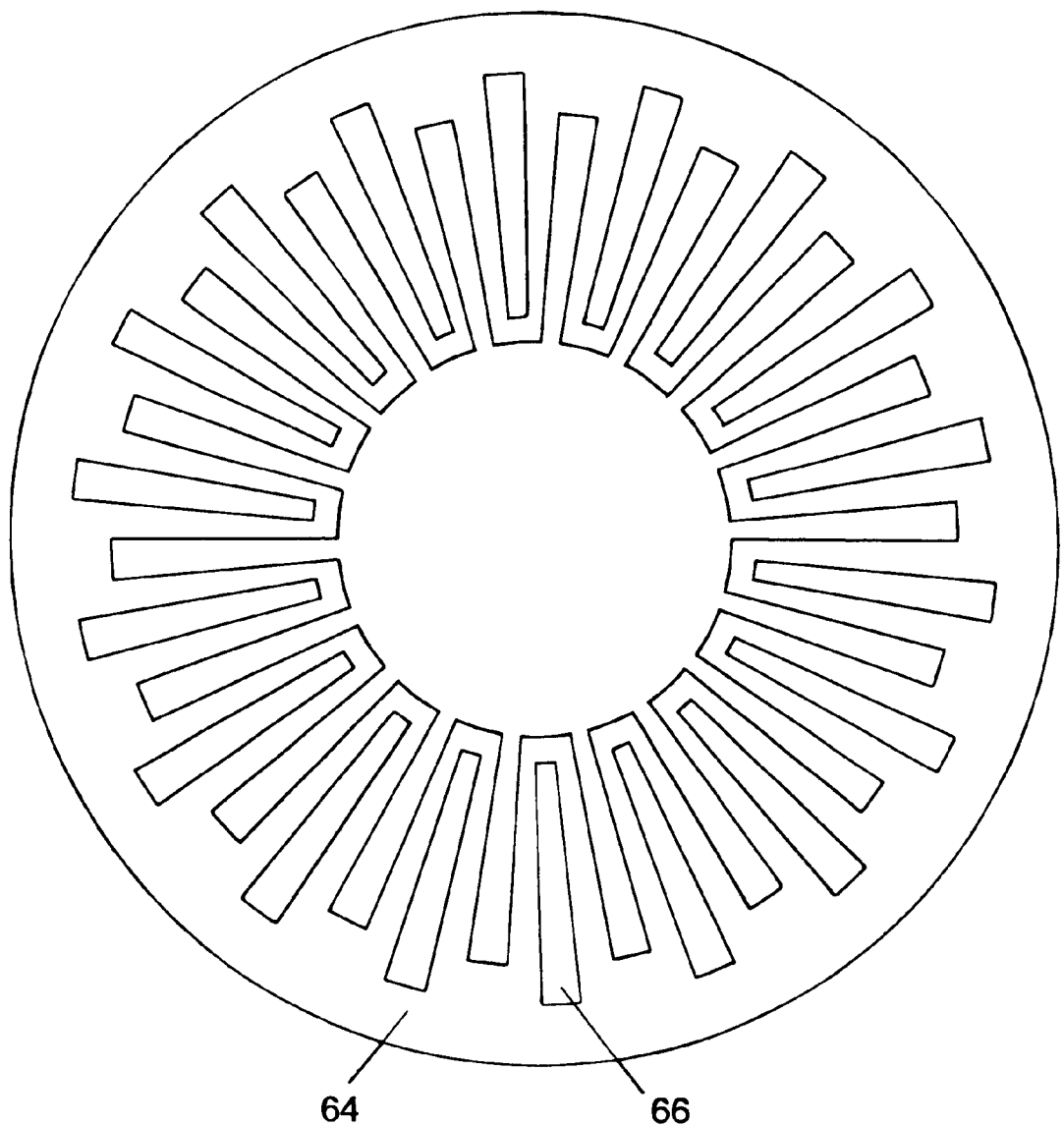
FIG. 8 is a three-dimensional view of an arbitrary, irregular shape, with the cooling channels fabricated into the component.

Multiple cooling passages could be incorporated for separate cooling media, including, but not limited to the possibilities of heat exchanger technology in solid bodies. FIG. 8 shows an arbitrary shape 64 with multiple independent loops 66 of cooling channels. FIG. 9 shows the cooling channels 68 incorporated into an irregular arbitrary shape 70 with some length, not to exclude twist or curvature of the extrusion.

This invention applies generally to a class of material deposition processes that use a laser to heat and, subsequently, fuse powder materials into solid layers. Since these layers can be deposited in sequential fashion to ultimately form a solid object, the ability to alter the material properties in a very localized fashion has far reaching implications, all of which have yet to be realized. To understand how the proposed material engineering method works, it is first necessary to understand how the laser material deposition processes function. FIGS. 1 and 2 will be used to provide the background information on the operation of the laser deposition processes and the remaining figures will then be used to describe some of the geometries that can be fabricated for the thermal management of a structure. Although, the use of these processes has demonstrated the ability to produce solid structures, the application of these technologies to embed features for thermal management of solid structures is novel. In fact, there are several in practice to build the solid objects that are somewhat contradictory. The purpose of this patent is to disclose how these technologies can be applied to produce structures with void and/or multi material regions, to enable thermal management techniques for solid structures, that are not available through conventional processing techniques.

In general, the laser material deposition processes function inside of a sealed chamber 20; although this is not a strict requirement. A laser 12 is used as a heat source to simultaneously heat a deposition substrate 32 and a powder feedstock material 36 that is supplied to the beam/powder interaction region 40. The laser beam 26 is focused to provide a high irradiance area at or near the surface on which the deposition is to occur. The area comprised of the focused laser beam 34 and, only initially, the deposition substrate 32 surface is considered to comprise the deposition region. It should be noted; however, that the deposition region changes with time, thus it is not necessary for the deposition to always correspond to the surface of the deposition substrate 32. In fact, as the deposited material 30 layers build up, the deposition region can be very far away from the original deposition substrate 32 surface. At or near the deposition region, the powder feedstock material 36 intersects a focused laser beam 34 and becomes molten to create a new layer of material on an existing substrate.

As additional new material is supplied to the deposition region, the substrate on which the deposition is occurring is scanned in a predetermined fashion such that a specific pattern is created. This pattern defines the region where the material is to be deposited to create one layer for an object that is comprised of a series of these layers. The relative position between the focused laser beam 34 and the powder feedstock material 36 is fixed with respect to each other during the deposition process. However, relative motion between the deposition substrate 32 (which rests on the orthogonal positioning stages 18) and the beam/powder interaction zone 40 (where the laser beam and powder streams interact) is provided to allow specific patterns of materials to be deposited. Through this motion, materials may be deposited to form solid objects a layer at a time, to provide a surface-coating layer for enhanced surface properties, or to deposit material in a specific pattern for various applications. Computer controlled motion provides one means for controlling the relative motion between the deposition substrate 32 and the beam/powder interaction zone 40. The computer control method is preferred to control this motion since this enables the process to be driven directly by the data contained within CAD files.

While the invention has been described in detail with reference to certain preferred embodiments thereof, it will be understood that modifications and variations are within the spirit and scope of that which is described and claimed.

What is claimed is:

1. A method to create embedded features in a three dimensional structure, said method comprising:
   a. subjecting one or more feedstocks to a material deposition process and depositing said feedstock onto a substrate while heating the one or more feedstocks with a laser simultaneously with feedstock deposition onto the substrate;
   b. repeating step a. sufficient times in a defined, layerwise pattern to construct said three dimensional structure having embedded features selected from the group consisting of void regions and regions containing materials other than said one or more feedstocks.

2. The method of claim 1, wherein embedded features provide the ability, to control the temperature of said structure.

3. The method of claims 2, wherein a plurality of features is included to create temperature gradients within said structure.

4. The method of claim 1, wherein features provide the ability to actively control the temperature of the structure.

5. The method of claim 1, wherein features provide the ability to passively control the temperature of the structure.

6. The method of claim 1, wherein said features are designed to provide uniform pressure drop, and thus uniform temperature control within said structure.

7. The method of claim 1, wherein said features are fabricated such that support is provided to the external surfaces of said structure.

8. The method of claim 1, wherein said structures are used for tools in injection molding.

9. The method of claim 1, wherein said structures are used in heat exchangers and turbine blades.

10. The method of claim 1, wherein said features conform to a surface to provide isothermal control of surface temperature.

11. The method of claim 1, wherein said features include a combination of void regions and secondary material regions.

12. A method to control the thermal properties of a solid structure, said method comprising:
   a. subjecting one or more feedstocks to a material deposition process and depositing said feedstock onto a substrate while heating the one or more feedstocks with a laser simultaneously with feedstock deposition onto the substrate;
   b. repeating step a. sufficient times in a defined, layerwise pattern, incorporating voids and material than said one or more feedstocks within said pattern to construct a solid structure having controlled thermal properties.

13. A method to embed hollow and multi material structures within a normally solid component, said method comprising:
   a. subjecting one or more feedstocks to a material deposition process and depositing said feedstock onto a substrate while heating the one or more feedstocks with a laser simultaneously with feedstock deposition onto the substrate;
   b. repeating step a. sufficient times in a defined, layerwise pattern that creates voids or regions containing materials other than said one or more feedstocks, to construct a solid component having hollow and multi material structures therein.

14. A method to locally control the thermal history of a three dimensional structure, said method comprising:
   a. subjecting one or more feedstocks to a material deposition process and depositing said feedstock onto a substrate while heating the one or more feedstocks with a laser simultaneously with feedstock deposition onto the substrate;
   b. repeating step a. sufficient times in a defined, layerwise pattern incorporating regions of voids and/or materials other than said one or more feedstocks to construct a three dimensional structure with a particular thermal history, thereby forming the three dimensional structure with a particular thermal history.

15. The method of claim 14, wherein said regions of voids or materials other than said one or more feedstocks comprise a combination of both.

16. A method to provide high efficient heat transfer within a three dimensional structure, said method comprising:
   a. subjecting one or more feedstocks to a material deposition process and depositing said feedstock onto a substrate while heating the one or more feedstocks with a laser simultaneously with feedstock deposition onto the substrate;
   b. repeating step a. sufficient times in a defined, layerwise pattern incorporating regions of voids and/or materials other than said one or more feedstocks effective to control heat transfer while constructing said three dimensional structure.

17. A method to create components that allow thermal characteristics of a three dimensional structure to be engineered into a component, said method comprising:
   a. subjecting one or more feedstocks to a material deposition process and depositing said feedstock onto a substrate while heating the one or more feedstocks with a laser simultaneously with feedstock deposition onto the substrate;

b. repeating step a. sufficient times in a defined, layerwise pattern, incorporating embedded voids or regions of varying materials, to construct said three dimensional structure.

18. The method of claim 17, wherein said voids or regions of varying materials comprise a combination of both.

19. A method to control pressure drop across embedded features in a three dimensional structure, said method comprising:

a. subjecting one or more feedstocks to a material deposition process and depositing said feedstock onto a substrate while heating the one or more feedstocks with a laser simultaneously with feedstock deposition onto the substrate;

b. repeating step a. sufficient times in a defined, layerwise pattern in which the cross-section area and length of individual embedded structures are approximately equal in order to provide uniform flow characteristics and pressure in said three dimensional structure.

* * * * *